(12) United States Patent
Chapman

(10) Patent No.: US 10,612,675 B2
(45) Date of Patent: *Apr. 7, 2020

(54) PRESSURE ASSISTED ROTARY PINCH VALVE

(71) Applicant: John Eric Chapman, Gray, TN (US)

(72) Inventor: John Eric Chapman, Gray, TN (US)

( * ) Notice: Subject to any disclaimer, the term of this patent is extended or adjusted under 35 U.S.C. 154(b) by 64 days.

This patent is subject to a terminal disclaimer.

(21) Appl. No.: 16/143,575

(22) Filed: Sep. 27, 2018

(65) Prior Publication Data

US 2020/0011435 A1    Jan. 9, 2020

Related U.S. Application Data

(63) Continuation-in-part of application No. 15/730,353, filed on Oct. 11, 2017, now Pat. No. 10,378,662.

(60) Provisional application No. 62/406,459, filed on Oct. 11, 2016.

(51) Int. Cl.
*F16K 7/00* (2006.01)
*F16K 7/06* (2006.01)
*F16K 31/528* (2006.01)

(52) U.S. Cl.
CPC .......... *F16K 7/065* (2013.01); *F16K 31/5288* (2013.01)

(58) Field of Classification Search
CPC ..... F16K 7/07; F16K 7/04; F16K 7/06; F16K 7/063; F16K 31/44
See application file for complete search history.

(56) References Cited

U.S. PATENT DOCUMENTS

| | | | |
|---|---|---|---|
| 1,701,411 A | 2/1929 | Kellam | |
| 1,897,743 A | 2/1933 | Warner | |
| 2,250,122 A | 7/1941 | Bjarnson | |
| 2,600,493 A | 6/1952 | Farris | |
| 3,467,151 A | 9/1969 | Vogt | |
| 3,759,483 A | 9/1973 | Baxter | |
| 3,920,215 A | 11/1975 | Knauf | |
| 4,582,292 A | 4/1986 | Glotzback et al. | |
| 4,630,635 A | 12/1986 | Bernstein | |
| 4,682,755 A | 7/1987 | Bernstein | |
| 5,441,231 A | 8/1995 | Payne | |
| 8,807,517 B2 | 8/2014 | Townsend | |
| 10,378,662 B2 * | 8/2019 | Chapman | ................ F16K 31/44 |
| 2012/0018654 A1 | 1/2012 | Wenneberg et al. | |

OTHER PUBLICATIONS

International Search Report, Written Opinion, Search Strategy, and Transmittal dated Dec. 10, 2019, issued in PCT Patent Application No. PCT/US2019/053035.

* cited by examiner

*Primary Examiner* — Steven O Douglas
(74) *Attorney, Agent, or Firm* — Thomas M. Joseph, Esq.

(57) ABSTRACT

Flow through a sleeve is controlled with a housing. A removable frame is positioned within the housing. A removable, tubular rotational mechanism defines a hole for receiving the sleeve therein. A pair of arms are pivotally mounted on the rotational mechanism for squeezing the sleeve. An actuator drives the rotational mechanism to pivot the pair of arms to open and to close the sleeve.

20 Claims, 12 Drawing Sheets

PRESSURE ASSISTED ROTARY PINCH VALVE

CROSS REFERENCE TO RELATED APPLICATION

This application is a continuation-in-part of co-pending U.S. patent application Ser. No. 15/730,353 entitled "PRESSURE ASSISTED ROTARY PINCH VALVE" filed Oct. 11, 2017, which claims the benefit under 35 U.S.C. § 119(e) of U.S. Provisional Application No. 62/406,459 entitled "PRESSURE ASSISTED ROTARY PINCH VALVE" filed Oct. 11, 2016, both of which are incorporated herein by reference.

BACKGROUND

Valves are devices for controlling the passage of fluid or air through a pipe, duct, sleeves, or other similar devices. Conventional valves utilize closing elements to interfere with fluid flow. A pinch valve is a control valve that uses a pinching effect to obstruct flow in an internal sleeve. Pinch valves differ from conventional valves because pinch valves apply pressure on a sleeve to prevent flow, instead of using separate closing elements.

Pinch valves do not need closing elements, so that the flow of fluid or air through the valve will be unimpeded by closing elements. Pinch valves are frequently used in applications where solid or semi-solid material, such as powder, granules, pellets, fibers or similar material, flow within the sleeve. Pinch valves can be used in soft applications, such as waste water plants or heavy industrial applications.

Since pinch valves have an unobstructed flow path in the open position, pinch valves can create minimal pressure drops to enhance downstream instrumentation control. The unobstructed flow through pinch valves can be advantageous in handling fluids that can shear when forced through complex internals. Pinch valves are highly tolerant of particulates in the fluid streams and can be very simple in construction.

Conventional pinch valves include mechanical pinch valves that can apply pressure using a movable closure bar at one point of a circumference of a sleeve. Such pinch valves can position the movable closure bar at the top of the circumference of the sleeve, so that the closure bar flattens the sleeve towards a fixed bottom to deform the sleeve, greatly.

Other pinch valves utilize air pressure to flatten the sleeve. Alternatively, mechanically driven presses are mostly screw-driven because high forces are needed to close pressurized sleeves and usually require fully encased sleeves.

Conventional pinch valves are primarily screw driven. Such pinch valves typically utilize elastomer sleeves with a pinch location in the centerline of the sleeve for wear purposes. The screw-driven linear gearing significantly reduces the mechanical efficiency, requires a substantial amount of power, and has an increased cost associated with the actuator-valve combination. The presence of a screw-driven system also requires multiple turns to drive the closure bars together which can effect closure times, adversely, and can lead to safety concerns in applications that require a fast shut-off. Therefore, there is a need for an improved pinch valve that meets requirements of a broad range of applications while providing ease of maintenance, reduce thrust required to close, fast maintenance, and less costly actuators.

SUMMARY

The following summary is provided to introduce a selection of concepts in a simplified form that are further described below in the detailed description. This summary is not intended to identify key features or essential features of the claimed subject matter, nor is it intended to be used to limit the scope of the claimed subject matter.

In various implementations, flow through a sleeve is controlled with a housing. A removable frame is positioned within the housing. A removable, tubular rotational mechanism defines a hole for receiving the sleeve therein. A pair of arms are pivotally mounted on the rotational mechanism for squeezing the sleeve. An actuator drives the rotational mechanism to pivot the pair of arms to open and to close the sleeve.

In other implementations, a pinch valve assembly controls flow through a sleeve. A tubular rotational mechanism defines a hole for receiving the sleeve therein. A pair of arms is pivotally mounted on the rotational mechanism for squeezing the sleeve. An actuator drives the rotational mechanism to pivot the pair of arms to open and to close the sleeve.

In yet other implementations, a method for controlling flow through a sleeve includes providing a tubular rotational mechanism with a hole therein and a pair of pivotally mounted arms thereon. The sleeve is inserted into the tubular rotational mechanism hole and between the pair of pivotally mounted arms. The pair of pivotally mounted arms is squeezed to close the sleeve.

These and other features and advantages will be apparent from a reading of the following detailed description and a review of the appended drawings. It is to be understood that the foregoing summary, the following detailed description and the appended drawings are explanatory only and are not restrictive of various aspects as claimed.

The foregoing and other features will become more apparent upon reading of the following non-restrictive description of illustrative embodiments thereof, given by way of example only with reference to the accompanying drawings.

DETAILED DESCRIPTION

Figure 1:
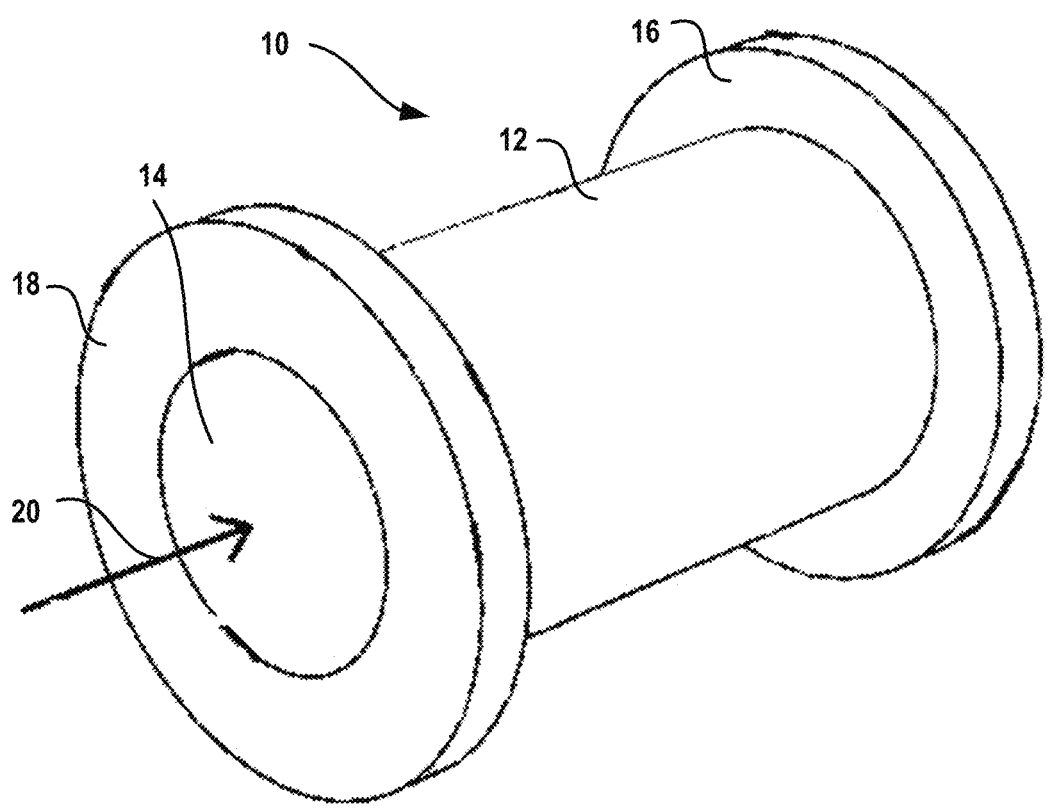
FIG. 1 is a perspective view of a sleeve for use with a pinch valve in accordance with this disclosure.

An industrial valve is disclosed. The industrial valve can be an elastomer valve or pinch valve. Such valves are valves that use a driving mechanism to force close a sleeve that is made from a rubber sleeve or a sleeve that is made from some other flexible, chemical resistant material. The elastomer valve closes the sleeve through an action that is similar to kinking a water hose shut. However, elastomer valves are pinched using a press or charged air to pinch the sleeve inside the valve body.

The detailed description provided below in connection with the appended drawings is intended as a description of examples and is not intended to represent the only forms in which the present examples can be constructed or utilized. The description sets forth functions of the examples and sequences of steps for constructing and operating the examples. However, the same or equivalent functions and sequences can be accomplished by different examples.

References to "one embodiment," "an embodiment," "an example embodiment," "one implementation," "an implementation," "one example," "an example" and the like, indicate that the described embodiment, implementation or example can include a particular feature, structure or characteristic, but every embodiment, implementation or example can not necessarily include the particular feature, structure or characteristic. Moreover, such phrases are not necessarily referring to the same embodiment, implementation or example. Further, when a particular feature, structure or characteristic is described in connection with an embodiment, implementation or example, it is to be appreciated that such feature, structure or characteristic can be implemented in connection with other embodiments, implementations or examples whether or not explicitly described.

Numerous specific details are set forth in order to provide a thorough understanding of one or more embodiments of the described subject matter. It is to be appreciated, however, that such embodiments can be practiced without these specific details.

Various features of the subject disclosure are now described in more detail with reference to the drawings, wherein like numerals generally refer to like or corresponding elements throughout. The drawings and detailed description are not intended to limit the claimed subject matter to the particular form described. Rather, the intention is to cover all modifications, equivalents and alternatives falling within the spirit and scope of the claimed subject matter.

Several types of pinch valves are known. The most common type of pinch valve is a mechanically driven pinch valve that includes an actuator. Another common type of pinch valve is an air operated pinch valve that uses charged air to overcome the line pressure and force an elastomer sleeve closed. Some pinch valves can be linear pinch valves. Other pinch valves can be rotary pinch valves.

Various embodiments of a rotary pinch valve are disclosed. More specifically, a pinch valve having arms that are mounted, pivotally, to an inserted plate is disclosed. An upper casing or a lower casing can be pressurized to reduce the force required to close a sleeve. The casings can be removed, independently, so that a valve operator or maintenance worker can easily access valve internals. Various embodiments of a pinch valve that have the ability to meet the requirements of heavy industrial applications while providing ease of maintenance are disclosed.

A pinch valve assembly that receives a tubular sleeve is disclosed. The pinch valve assembly can include a housing that includes an upper casing and a lower casing, a removeable frame, a rotational mechanism, and an actuator mechanism. The upper casing and the lower casing can be mounted to one another using removable bolts. The tubular sleeve can be inserted into the housing. The housing can be open or closed to retain an external air pressure used to help close the sleeve and to reduce actuator forces.

The rotational mechanism can be a gearing mechanism for pinching the removeable sleeve. The rotational mechanism can include a mounting plate and a pair of pinch arms. The pinch arms can open or close the sleeve, at least partially. In some embodiments, a quarter-turn actuator is deployed within the actuator mechanism. In such embodiments, the sleeve can be removed without moving the actuator.

In some embodiments, the actuator can be a hybrid system that includes a pressure-assisted component and a mechanical component. The pressure-assisted component can reduce the amount of force that is needed to close the valve with the mechanical component. The mechanical component can be configured in a "failsafe" configuration, so that the valve closes upon failure of the actuator.

The pinch valve assembly can include pinch arms that are movable parts of a pinch valve assembly for applying pressure on a sleeve. The pinch valve assembly can include actuators that are devices for exerting motion. The pinch valve assembly can include bearings that represent bodies that reduce friction caused from rotational motion.

Pinch valves and elastomer valves have a distinct set of advantages over metallic or ceramic valves. They are commonly used in chemical, mining, and wastewater applications, but can be used in applications that range from the harshest and dirtiest environments to the cleanest food processing plants. Pinch valves are most frequently chosen over metallic valves with excessive wear, caustic or abrasive conditions because of the ability of elastomers to resist wear and cavitation while coming in a variety of material types to fit almost any application.

Referring now to the drawings, FIG. 1 illustrates a flexible sleeve, generally designated by the numeral 10, having an elongated, tubular body 12. The sleeve 10 has a circular internal passage 14 for transporting fluids threrethrough. The sleeve 10 has a pair of flanges 16-18 positioned at each end of the body 12. The sleeve 10 has sufficient flexibility, so that it is capable of being compressed to manipulate or to control the flow of fluids therethrough by closing the internal passage 14. The internal passage 14 can be closed partially to regulate or fully to terminate the flow of fluids along a bi-directional flow path defined by a centerline 20 of the sleeve 10.

Figure 2:
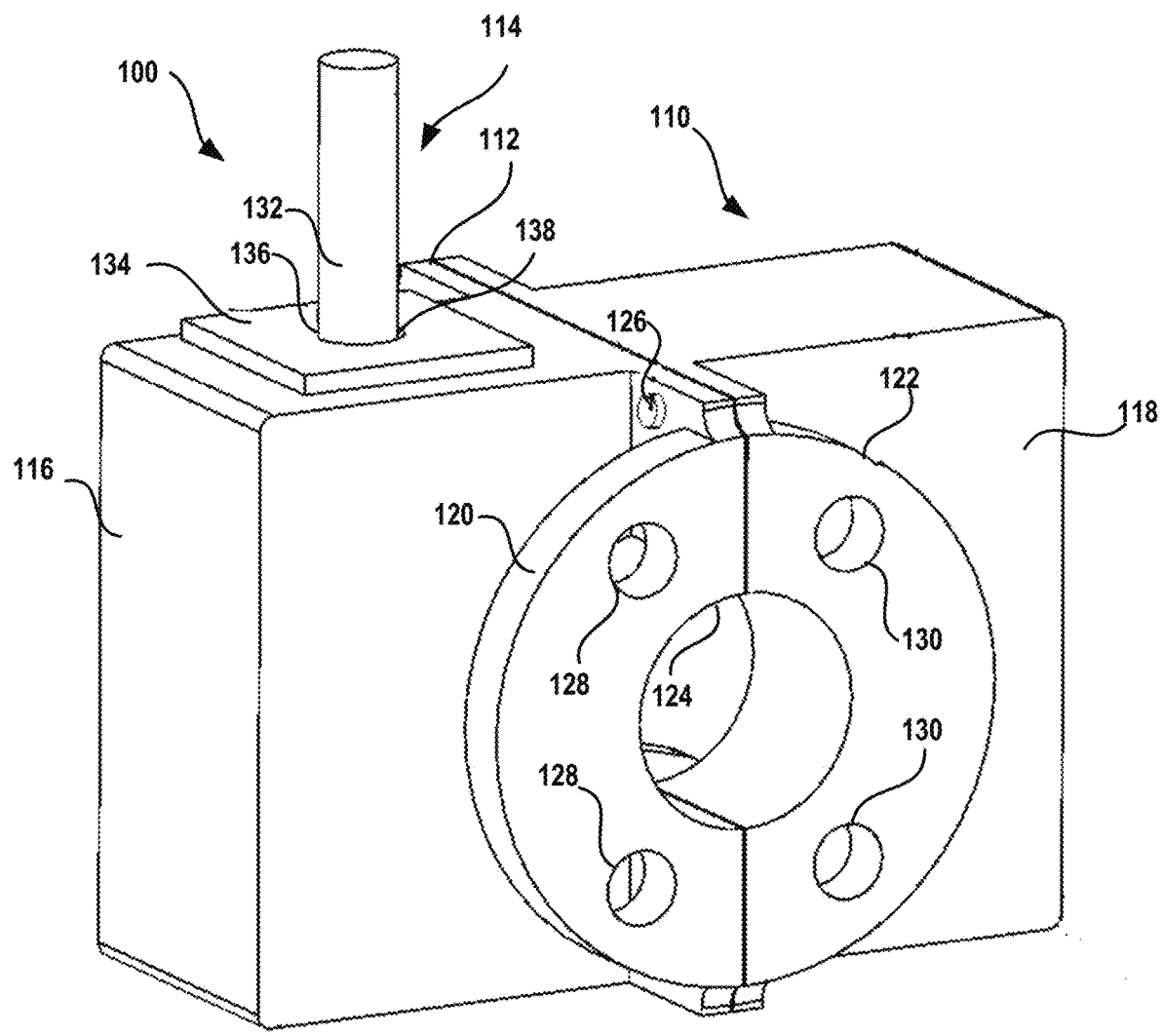
FIG. 2 is a perspective view of an embodiment of a pinch valve assembly in accordance with this disclosure.
Figure 3:
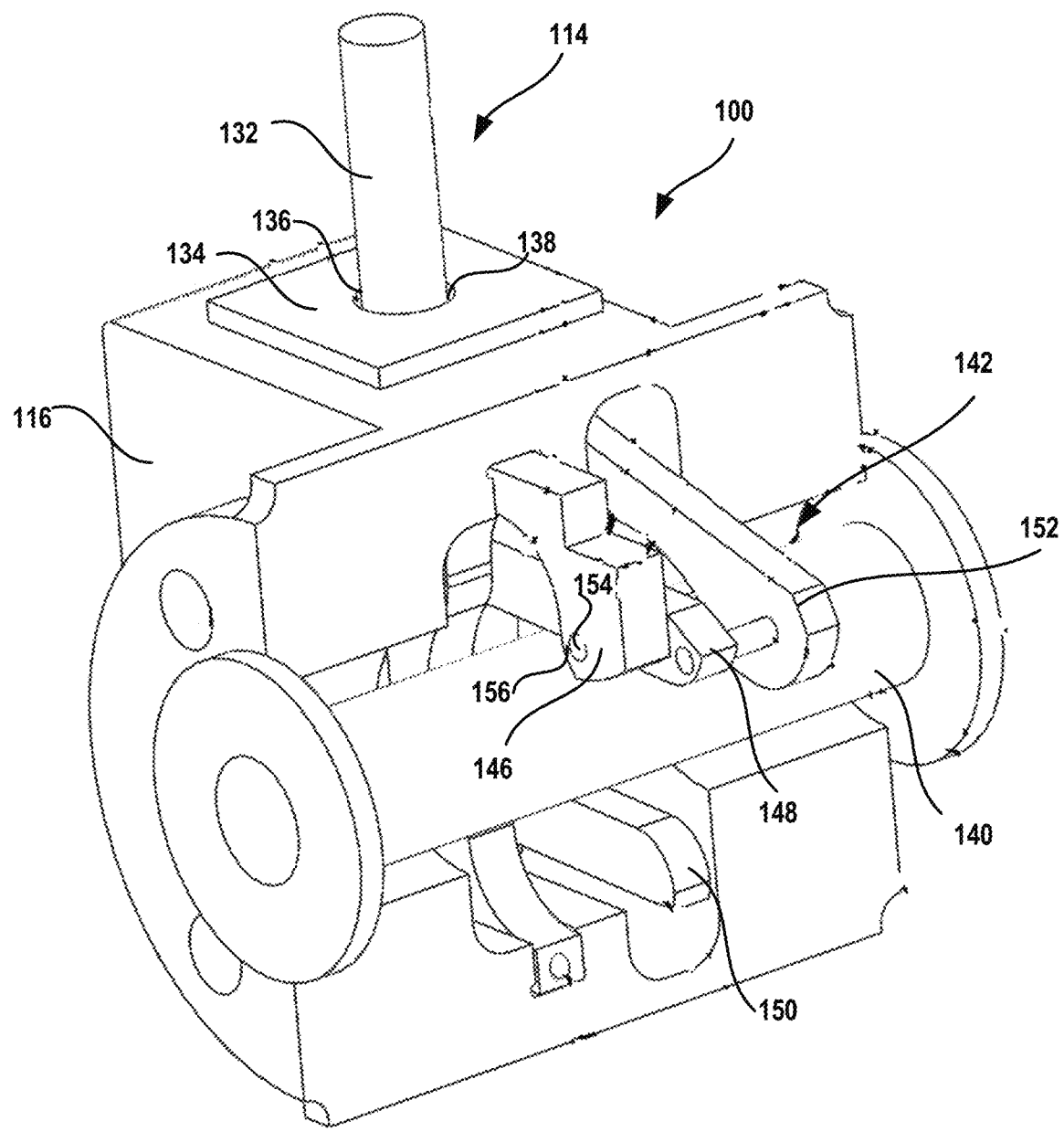
FIG. 3 is a fragmentary perspective view of the embodiment of the pinch valve assembly shown in FIG. 2 in accordance with this disclosure.

Referring now to FIG. 2 with continuing reference to the foregoing figure, a pinch valve, generally designated by the numeral 100, is shown. The pinch valve 100 includes a pinch valve assembly 110 that can receive the sleeve 10 shown in FIG. 1. The pinch valve assembly 110 can squeeze the sleeve 10 to restrict fluid flow therethrough either partially or fully. The pinch valve assembly 110 can include a housing 112 and an actuator mechanism 114.

The housing 112 can be an essentially two-piece casing that is formed from an upper casing 116 and a lower casing 118. The terms "upper" and "lower" are relative terms and include configurations, as shown in FIG. 2, in which the upper casing 116 is positioned side-by-side with the lower casing 118. The upper casing 116 includes a flange structure 120. The lower casing 118 includes a flange structure 122.

The flange structures 120-122 define an internal passageway 124 that receives the sleeve 10 shown in FIG. 1. In some embodiments, the internal passageway 124 includes a sleeve having an internal passage 14 with a diameter of about 2 inches.

The upper casing 116 connects to the lower casing 118 with a locking element 126 that can be a bolt or other similar fastener. The flange structure 120 includes a plurality of bolt holes 128. The flange structure 122 includes a plurality of bolt holes 130. The bolt holes 128-130 can receive locking elements or bolts (not shown) to stabilize the sleeve 10 within the internal passageway 124. In other embodiments, the upper casing 116 can be joined to the lower casing 118 through welding or other similar means to eliminate the locking element 126.

The actuator mechanism 114 can be a conventional mechanical actuator mechanism. The actuator mechanism 114 includes an elongated shaft 132 inserted into a tubular actuator brace 134. The elongated shaft 132 can be a guiding shaft or other elongated cylindrical bar. In this exemplary embodiment the elongated shaft 132 is linearly driven. In some embodiments, the elongated shafted can have a linear stroke of about 0.5 inches to represent a 1:4 ratio of stroke to close distance.

The actuator brace 134 can be a solid piece or object for attachment to other elements. The actuator brace 134 can include valve packing 136 for supporting the elongated shaft 132 when it is inserted into cavity 138 that is defined by the actuator brace 134. The valve packing 136 can be a sealing mechanism that seals around penetrations into the valve cavity 138. In some embodiments, the cavity 138 can be pressurized to reduce the pressure that is required for the actuator mechanism 114 to close the valve 100.

The valve packing 136 can include gaskets, O-rings, pastes, glues, or other similar materials. In some embodiments, the elongated shaft 132 can be manually manipulated to trigger the actuator mechanism 114. In other embodiments, the elongated shaft 132 can be automated. Additionally, the actuator mechanism 114 can be a manual actuator, a power-driven rotary actuator, and a linear actuator in such embodiments. The actuator mechanism 114 can include an accumulator with a failsafe pneumatic, a hydraulic actuator, or a four-way cavity inlet that can close the valve 100 without power.

Referring now to FIGS. 3-6 with continuing reference to the foregoing figures, the internal workings of the pinch valve assembly 100 shown in FIG. 2 are illustrated. The pinch valve assembly 100 receives a flexible, tubular sleeve 140 that is essentially equivalent to the sleeve 10 shown in FIG. 1. The pinch valve assembly 100 controls the flow of fluids through the sleeve 140.

The pinch valve assembly 100 includes a removable frame 142, which is attached to the upper casing 116. The frame 142 includes a tubular rotational mechanism 144, a backing plate 146, and a pair of arms 148-150. The rotational mechanism 144 is an assembly for closing the sleeve 140 by translating rotational motion into linear motion. The rotational mechanism 144 can surround the sleeve 140 and can have a member that defines a cam 152 that comprises a rotational element sliding on specific points imparting motion onto other elements. The rotational mechanism 144 can be a synchronized gearing mechanism.

The arms 148-150 can be pivotally mounted on the frame 142 and are positioned on opposite sides of the sleeve 140. The backing plate 146 can be a plate that contains rotational motion. The backing plate 146 can be built-in or removable, and can extend to contain the cam 152. The arms 148-150 can pivotally mounted on the frame 142 in a manner that enables each arm 148-150 to be mounted at any orientation within a range of 360 degrees.

The arms 148-150 can be driven to pivot on the rotational mechanism 144 by the elongated shaft 132. In this exemplary embodiment, the elongated shaft 132 is a piston shaft supported by the actuator brace 134. In other embodiments, the elongated shaft 132 can be incorporated into or replaced by a screw-driven system to convert the valve assembly 100 into a manually operated variant. In yet other embodiments, the elongated shaft 132 can driven linearly to drive the rotational mechanism 144 by a mechanical system, an electrical system, a pneumatic system, a hydraulic system, a gear system that includes a rack & pinion, or any other suitable gear-driven system.

The actuator mechanism 114 and the elongated shaft 132 can drive the rotational mechanism 144 to rotate the cam 152. The rotational movement can be translated into the arms 148-150 to move in synchronization because the cam 152 is a single piece. In such movements, the arm 148 moves in an upward direction when the arm 150 moves in a downward direction to constrict or to open the sleeve 140.

The frame 142 can be connected with or can cooperate with the actuator mechanism 114 to drive the pivotally mounted arms 148-150. The actuator mechanism 114 can drive the arms 148-150 to squeeze the sleeve 140 to restrict flow therethrough.

As shown in FIGS. 3-6, the backing plate 146 is connected to the rotational mechanism 144 through the use of race pins 154 that insert into bores 156. A slot pin 158 can insert into a rotational slot 160 along a centerline axis to create a pivot point for the rotational mechanism to concentrically around the axis to drive the arms 148-150 into an open position, a closed position, or an intermediate position to control flow through the sleeve 140. In some embodiments, the number of race pins 154, bores 156, slot pins 158, and/or rotational slots 160 can be increased. In other embodiments, the race pins 154 and/or the slot pins 158 can be specially manufactured a solid element for fastening another element.

Alternatively, the rotational mechanism 144 can be connected to the backing plate 146 through other suitable connecting mechanisms that include bearings, bushings, slotted pins, or braced planetary gears for larger inner race pin diameters. Suitable connecting mechanisms include any connecting mechanisms that create secure pivot points for the rotational mechanism 144 to slide concentrically around a longitudinal centerline axis to drive the arms 148-150 to control flow.

The rotational mechanism 144 can include additional slot pins 162 for inserting into slots 164. The slots 164 can be rotational slots that are similar to the rotational slots 160 to facilitate pivoting of the rotational mechanism 144.

Figure 6:
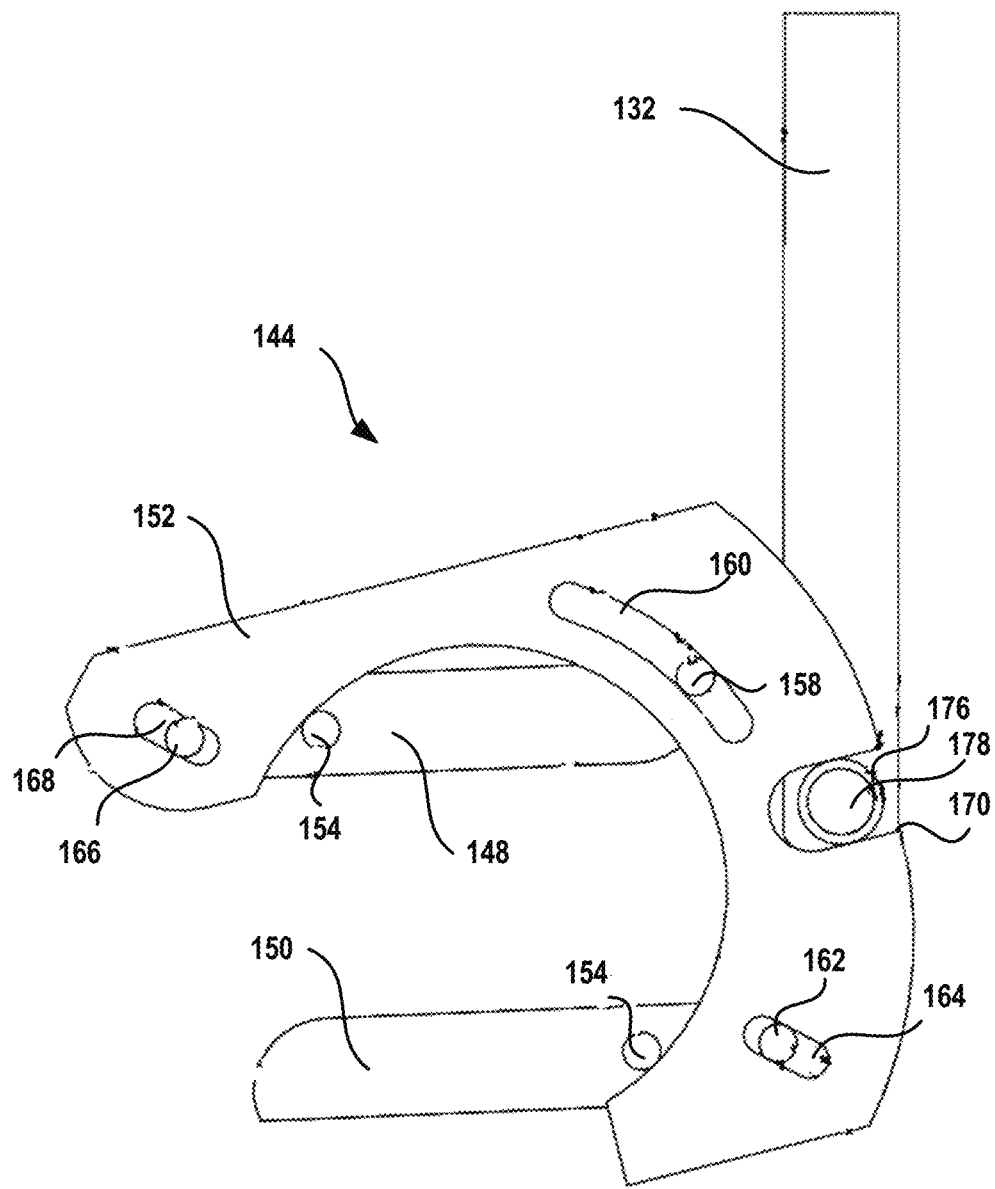
FIG. 6 is a bottom plan view of the rotational mechanism and actuator mechanism for the pinch valve assembly shown in FIG. 2 in accordance with this disclosure.

As shown in FIG. 6, the rotational mechanism 144 includes a drive pin 166 and a drive slot 168. The drive pin 166 can facilitate rotation of the arms 148-150 to open and to close the sleeve 140 by rotating the arms 148-150 about the slot pins 162, which function as a fulcrum point. In some embodiments, the stroke required to close the valve assembly 100 can be manipulated by changing the distance between a slot 170 and a centerline axis. Similarly, the manipulation of distance between the drive slot 168 and the race pins 154 can affect the stroke length.

Now referring to FIGS. 2-6, the sleeve 140 can be removed from between the arms 148-150 by removing the lower casing 118. When the lower casing 118 is removed, the upper casing 116 can support the rotational mechanism 144 through a fixation point 172. Additionally, the upper casing 116 can support the actuator mechanism 114.

Figure 4:
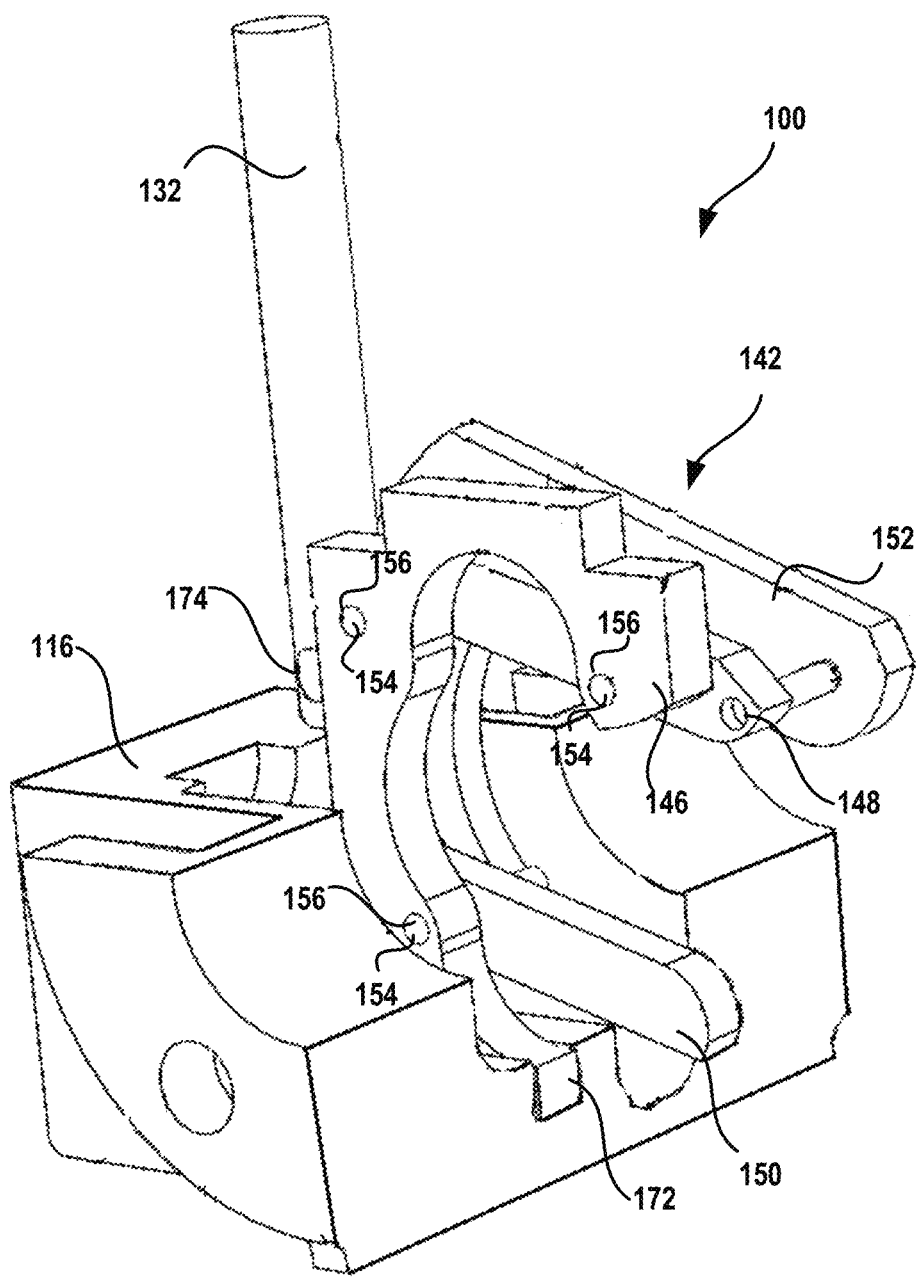
FIG. 4 is another fragmentary perspective view of the embodiment of the pinch valve assembly shown in FIG. 2 without the sleeve shown in FIG. 1 in accordance with this disclosure.
Figure 5:
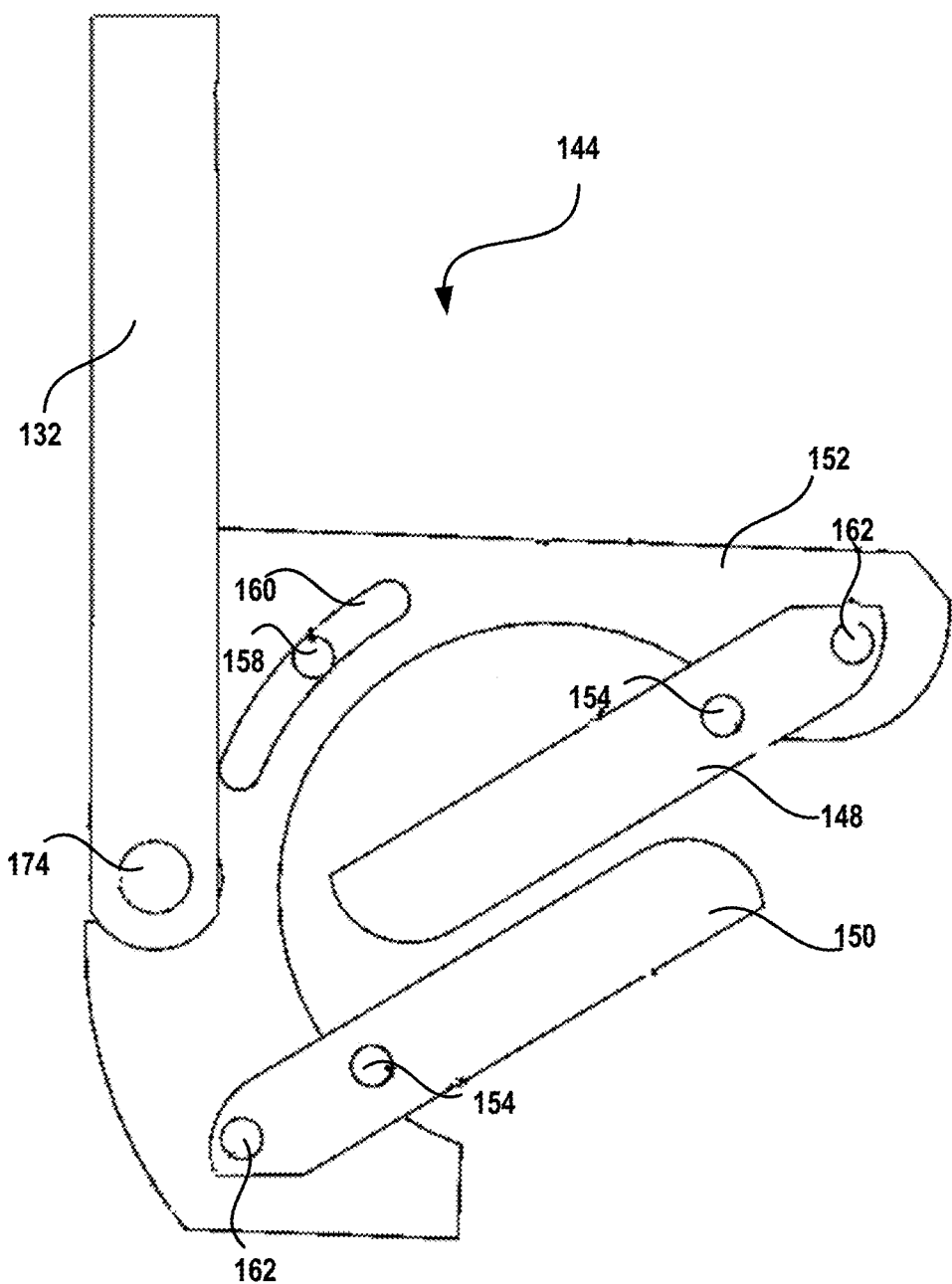
FIG. 5 is a top plan view of the rotational mechanism and actuator mechanism for the pinch valve assembly shown in FIG. 2 in accordance with this disclosure.

Now referring to FIGS. 4-6, the elongated shaft 132 is pivotally connected to the cam 152 about a pivot point 174. The cam 152 includes a bore 176 with a pin 178 that inserts through the bore 176.

Figure 7:
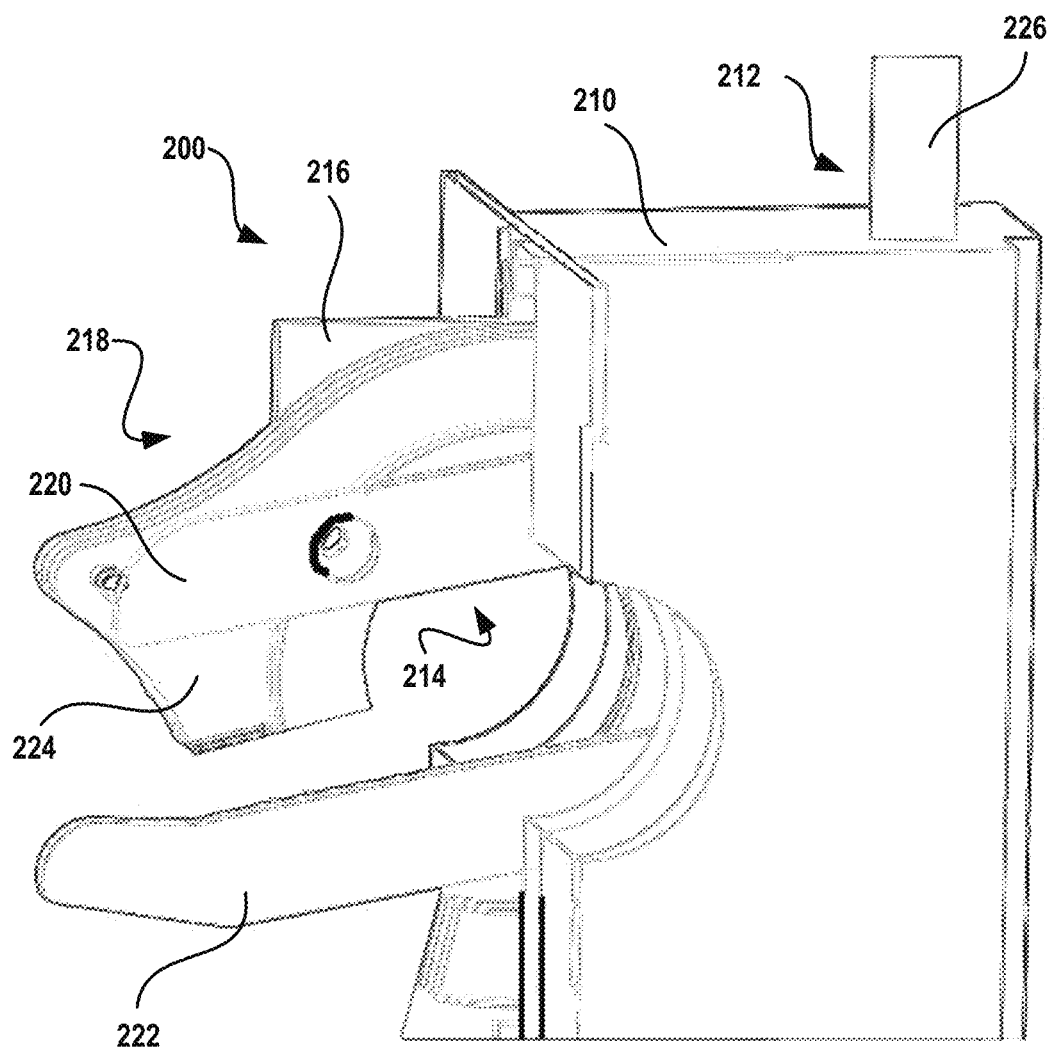
FIG. 7 is a perspective view of another embodiment of a pinch valve assembly in accordance with this disclosure.
Figure 8:
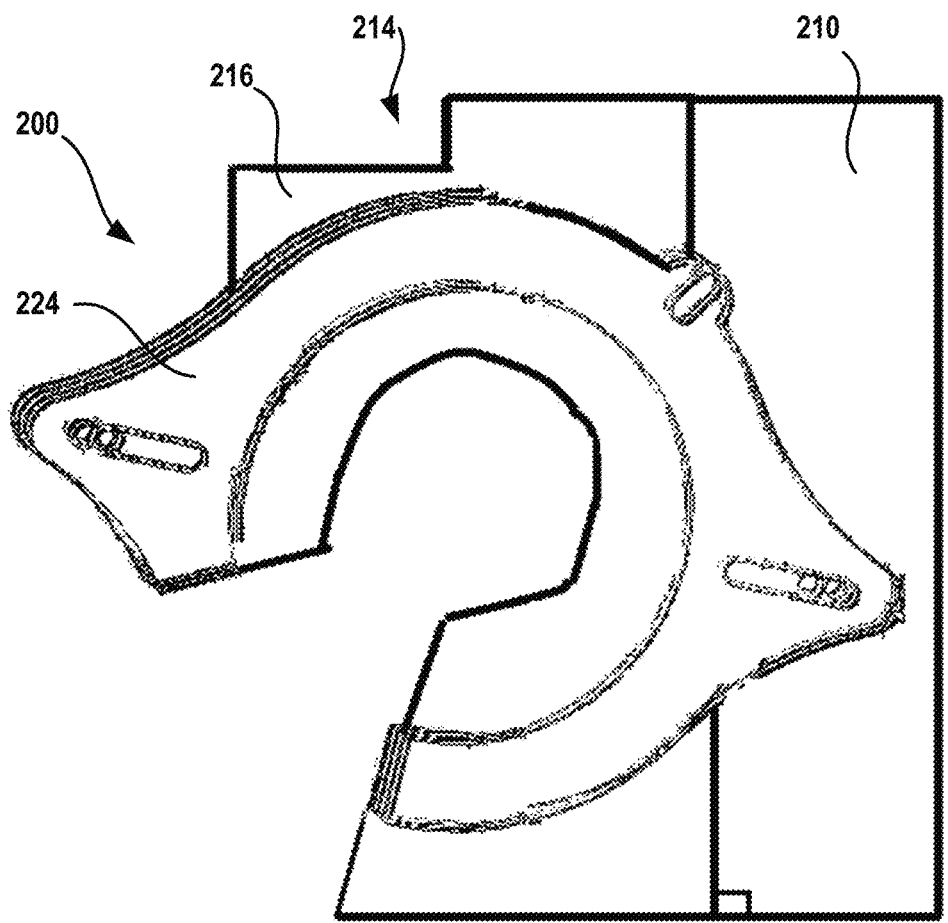
FIG. 8 is a fragmentary side elevation view in cross section of the pinch valve assembly shown in FIG. 7 in accordance with this disclosure.
Figure 9:
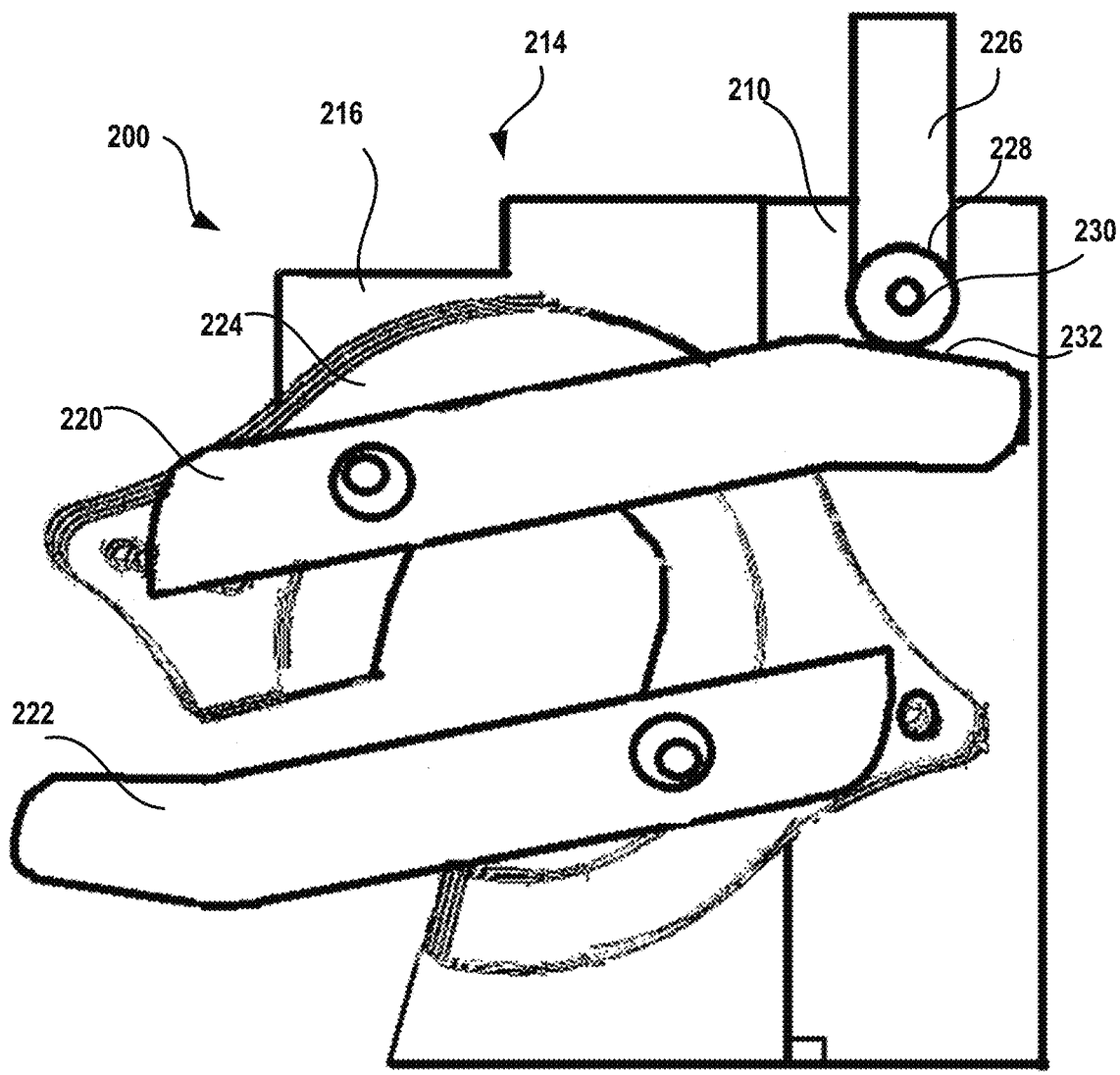
FIG. 9 is another fragmentary side elevation view in cross section of the pinch valve assembly shown in FIG. 7 in accordance with this disclosure.

Referring now to FIGS. 7-9 with continuing reference to the foregoing figures, another embodiment of a pinch valve assembly, generally designated with the numeral 200, is shown. The pinch valve assembly 200 has a housing 210 and an actuator mechanism 212. A frame 214 is mounted within the housing 210.

The frame 214 includes a backing plate 216, a rotational mechanism 218, and pair of arms 220-222. The rotational mechanism 218 includes a cam 224 thereon. The arms 220-222 are pivotally mounted on the cam 224. The actuator mechanism 212 includes an elongated shaft 226. Unlike the embodiments shown in FIGS. 2-6, the elongated shaft 226 on the actuator mechanism 212 includes a pivot joint 228 that abuts the arm 220.

In this exemplary embodiment, the pivot joint 228 can include a wheel or a ball 230. The pivot joint 228 can slide along a linear surface 232 on the arm 220 to rotate the cam 224. The rotation of the cam 224 will cause the arm 222 to move toward the arm 220 to squeeze a sleeve (not shown), which can be essentially identical to the tubular sleeve 10 shown in FIG. 1 or the tubular sleeve 140 shown in FIGS. 3-6.

Figure 10:
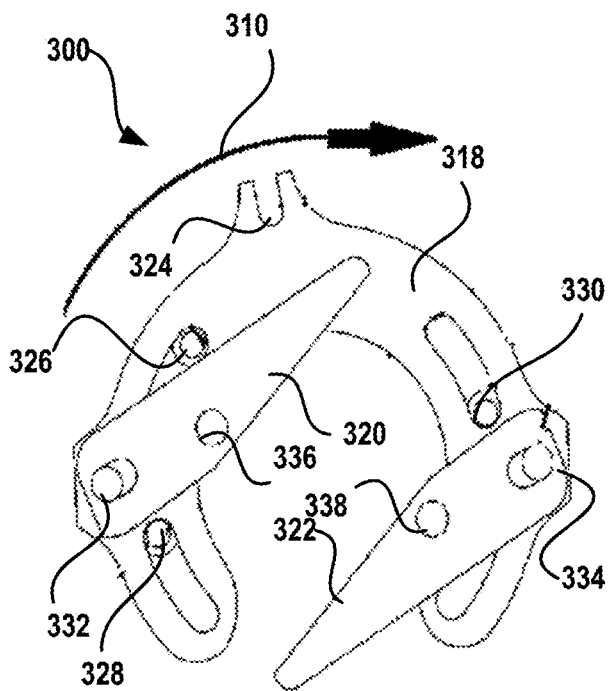
FIG. 10 is a top plan view of another embodiment of a rotational mechanism in accordance with this disclosure.
Figure 11:
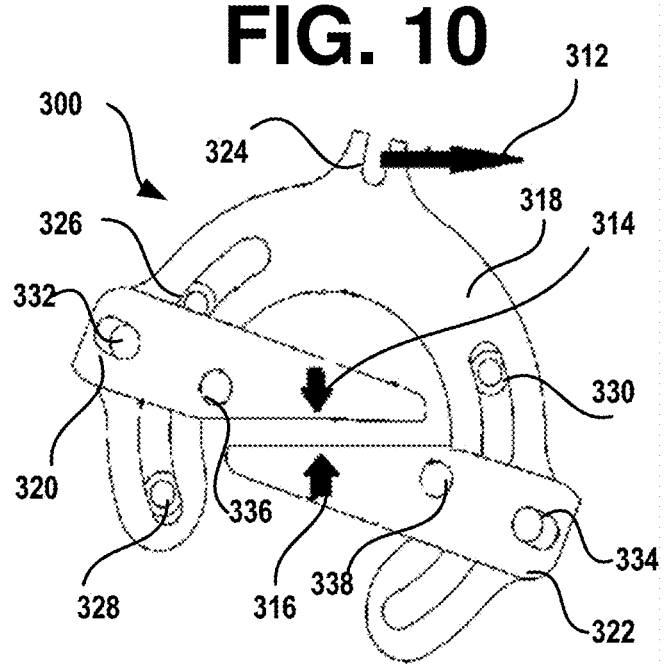
FIG. 11 is another top plan view of the embodiment of the rotational mechanism shown in FIG. 10 in accordance with this disclosure.

Referring now to FIGS. 10-11 with continuing reference to the foregoing figures, another embodiment of a rotational mechanism generally designated with the numeral 300, is shown. In this exemplary embodiment, the rotational mechanism 300 can be rotated by force 310 in an open position and by forces 312-316 in the closed position. The forces 314-316 are multiplied forces.

Like the embodiments shown in FIGS. 2-9, the rotational mechanism 300 includes a cam 318 with a pair of arms 320-322 pivotally mounted thereon. In this embodiment, the cam 318 includes a drive slot 324 and a plurality of rotational guides 326-330. A pair of arm drives 332-334 couple the arms 320-322 to the cam 318. The arms 320-322 rotate about pivot pins 336-338.

The rotational mechanism 300 maintains centerline closure while lowering the forces required by an actuator, such as the actuator mechanism 114 shown in FIG. 2. The arms 322-324 and cam 318 are used to multiply the input forces 310-312 from the actuator mechanism 114, shown in FIG. 2. This arrangement can overcome drawbacks associated with conventional pinch valves in which force requirements to close a pressurized tube increase as the valve size gets bigger.

Figure 12:
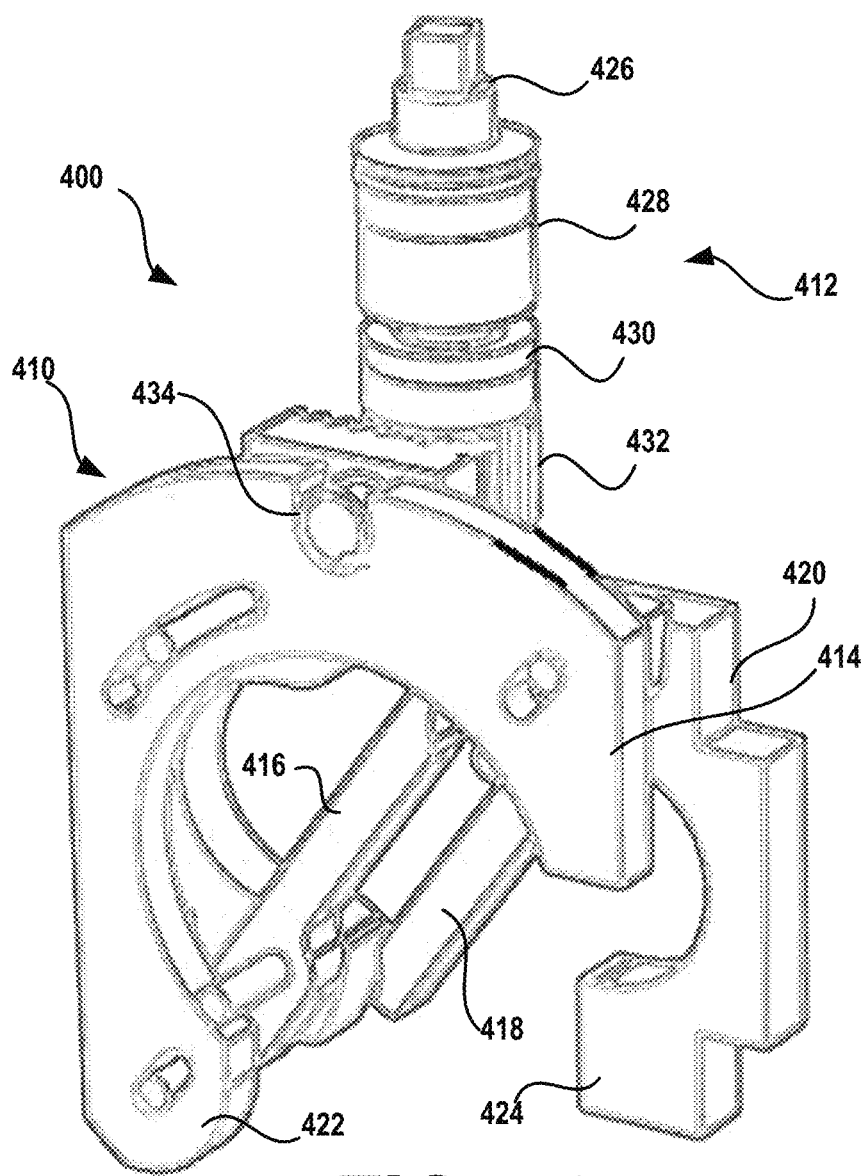
FIG. 12 is a perspective view of another embodiment of a rotational mechanism and actuator mechanism for the pinch valve assembly in accordance with this disclosure.

Referring now to FIG. 12 with continuing reference to the foregoing figures, another embodiment of a pinch valve assembly, generally designated with the numeral 400, is shown. In this exemplary embodiment, the pinch valve assembly 400 is particularly adapted for a quarter-turn actuator (not shown).

The pinch valve assembly 400 includes a cam mechanism 410 and an adapter 412. The cam mechanism 410 includes a cam member 414, a pair of pivotally mounted arms 416-418, and a mount 420. The cam member 414 includes an extension 422. The mount 420 includes an extension 424. The space between the cam member extension 422 and the mount extension 424 is sleeve removal space.

The adapter 412 includes a blow-out prevention square stem 426, upper packing 428, lower packing 430, and rack and pinion mechanism 432. The rack and pinion mechanism 423 is positioned with a drive slot 434 in the cam member 414.

Figure 13:
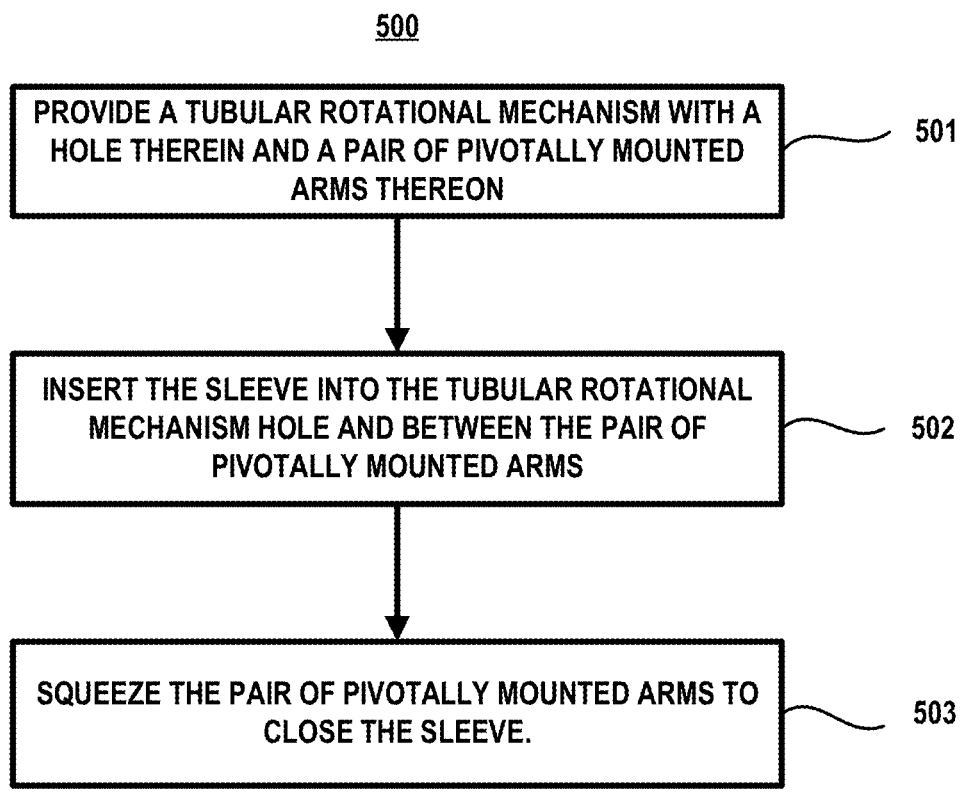
FIG. 13 is an exemplary process in accordance with this disclosure.

Referring to FIG. 13 with continuing reference to the foregoing figures, a method 500 for operating a pinch valve assembly in accordance with the described subject matter is shown. Method 500, or portions thereof, can be performed using the various embodiments of At 501, a tubular rotational mechanism with a hole therein and a pair of pivotally mounted arms thereon is provided. In this exemplary embodiment, the rotational mechanism can be the rotational mechanism 144 shown in FIGS. 2-6, the rotational mechanism 218 shown in FIGS. 7-9, the rotational mechanism 300 shown in FIGS. 10-11, or the cam member 414 shown in FIG. 12. The arms can be the arms 148-150 shown in FIGS. 2-6, the arms 220-222 shown in FIGS. 7-9, the arms 322-324 shown in FIGS. 10-11, and arms 416-418 shown in FIG. 12.

At 502, a sleeve is inserted into the tubular rotational mechanism hole and between the pair of pivotally mounted arms. In this exemplary embodiment, the sleeve can be the tubular sleeve 10 shown in FIG. 1 or the tubular sleeve 140 shown in FIGS. 3-6.

At 503, the pair of pivotally mounted arms is squeezed to close the sleeve. In this exemplary embodiment, the arms can be the arms 148-150 shown in FIGS. 2-6, the arms 220-222 shown in FIGS. 7-9, the arms 322-324 shown in FIGS. 10-11, and arms 416-418 shown in FIG. 12. The sleeve can be the tubular sleeve 10 shown in FIG. 1 or the tubular sleeve 140 shown in FIGS. 3-6.

Those of ordinary skill in the art will realize that the descriptions of the pinch valve are illustrative only and are not intended to be in any way limiting of an open-cam pinch valve system. Other embodiments will readily suggest themselves to such persons with ordinary skill in the art having the benefit of the present disclosure. Furthermore, the disclosed pinch valve can be customized to offer valuable solutions to existing needs and problems of pinch valve maintenance.

Supported Features and Embodiments

The detailed description provided above in connection with the appended drawings explicitly describes and supports various features of a rotatory pinch valve assembly. By way of illustration and not limitation, supported embodiments include: an apparatus for controlling flow through a sleeve, the apparatus comprising: a housing, a removable frame positioned within the housing, a removable, tubular rotational mechanism defining a hole for receiving the sleeve therein, a pair of arms pivotally mounted on the rotational mechanism for squeezing the sleeve, and an actuator for driving the rotational mechanism to pivot the pair of arms to open and to close the sleeve.

Supported embodiments include the foregoing apparatus, wherein the actuator is selected from the group consisting of a manual actuator, a power-driven rotary actuator, and a linear actuator.

Supported embodiments include any of the foregoing apparatuses, wherein the arms are pivotally mounted on the rotational mechanism in a manner that enables each arm to be mounted at any orientation within a range of 360 degrees.

Supported embodiments include any of the foregoing apparatuses, wherein the arms are mounted to close the sleeve in a horizontal direction.

Supported embodiments include any of the foregoing apparatuses, wherein the arms are mounted to close the sleeve in a vertical direction.

Supported embodiments include any of the foregoing apparatuses, wherein the housing includes an upper casing and a lower casing.

Supported embodiments include any of the foregoing apparatuses, wherein the upper casing and the lower casing are removable.

Supported embodiments include any of the foregoing apparatuses, wherein the actuator include an actuator brace that defines a cavity.

Supported embodiments include any of the foregoing apparatuses, wherein the cavity can be pressurized to reduce the force required to close the sleeve.

Supported embodiments include any of the foregoing apparatuses, wherein the actuator includes a component selected from the group consisting of accumulator with a failsafe pneumatic, a hydraulic device, and a four-way cavity inlet.

Supported embodiments include a system, a method, and/or means for implementing any of the foregoing apparatuses or portions thereof.

Supported embodiments include a pinch valve assembly for controlling flow through a sleeve, the pinch valve assembly comprising: a tubular rotational mechanism defining a hole for receiving the sleeve therein, a pair of arms pivotally mounted on the rotational mechanism for squeezing the sleeve, and an actuator for driving the rotational mechanism to pivot the pair of arms to open and to close the sleeve.

Supported embodiments include the foregoing pinch valve assembly, further comprising: a housing, and a removable frame positioned within the housing, wherein the tubular rotational mechanism is mounted on the frame.

Supported embodiments include any of the foregoing pinch valve assemblies, wherein the housing includes an upper casing and a lower casing.

Supported embodiments include any of the foregoing pinch valve assemblies, wherein the upper casing and the lower casing are removable.

Supported embodiments include any of the foregoing pinch valve assemblies, wherein the actuator include an actuator brace that defines a cavity.

Supported embodiments include any of the foregoing pinch valve assemblies, wherein the cavity can be pressurized.

Supported embodiments include any of the foregoing pinch valve assemblies, wherein the actuator is selected from the group consisting of a manual actuator, a power-driven rotary actuator, and a linear actuator.

Supported embodiments include an apparatus, a system, a method, and/or means for implementing any of the foregoing pinch valve assemblies or portions thereof.

Supported embodiments include a method for controlling flow through a sleeve, the method comprising: providing a tubular rotational mechanism with a hole therein and a pair of pivotally mounted arms thereon, inserting the sleeve into the tubular rotational mechanism hole and between the pair of pivotally mounted arms, and squeezing the pair of pivotally mounted arms to close the sleeve.

Supported embodiments include the foregoing method, further comprising: driving the pair of pivotally mounted arms.

Supported embodiments include any of the foregoing methods, further comprising: releasing the pair of pivotally mounted arms to open the replaceable sleeve.

Supported embodiments include any of the foregoing methods, further comprising: driving the rotational mechanism with an actuator to pivot the pair of arms to open and to close the sleeve.

Supported embodiments include any of the foregoing methods, further comprising: pressurizing an actuator to drive the rotational mechanism to pivot the pair of arms to open and to close the sleeve Supported embodiments include an apparatus, a system, and/or means for implementing any of the foregoing methods or portions thereof.

Supported embodiments can provide various attendant and/or technical advantages in terms of improved efficiency and/or savings with respect to cost reductions due to lower installation and actuator costs.

Supported embodiments include a pinch valve that can be used in clean environments.

Supported embodiments include a pinch valve that has a low probability of seat failure.

Supported embodiments include a pinch valve that provides minimal turbulence.

Supported embodiments include a pinch valve that has a low water hammer.

Supported embodiments include a pinch valve that minimizes or eliminate airborne contaminants.

Supported embodiments include pinch valves that require minimal maintenance and can be subject to in-line maintenance.

Supported embodiments include pinch valves that can be used in explosion-proof lines.

Supported embodiments include pinch valves that can have chemical resistance.

The detailed description provided above in connection with the appended drawings is intended as a description of examples and is not intended to represent the only forms in which the present examples can be constructed or utilized.

It is to be understood that the configurations and/or approaches described herein are exemplary in nature, and that the described embodiments, implementations and/or examples are not to be considered in a limiting sense, because numerous variations are possible. The specific processes or methods described herein can represent one or more of any number of processing strategies. As such, various operations illustrated and/or described can be performed in the sequence illustrated and/or described, in other sequences, in parallel, or omitted. Likewise, the order of the above-described processes can be changed.

For example, though the present disclosure illustrates a pinch valve having the shown upper and lower casings forming an open-cam support within an enclosed frame, the present teachings are equally applicable to any pinch valve having an externally driven pinch arm levers driven from a closed-cam frame with open frame construction.

Similarly, in operation, the forces to overcome the pinching force required on the internal forces for a pressurized sleeve can be large. In order to facilitate the pinch force, an internal can be pressurized to assist in overcoming internal pressures from flow within the sleeve with actuation by use of a nozzle penetrating either an upper casing or a lower casing.

Additionally, the disclosed pinch valve can be implemented as part of a hybrid system that includes a conventional air operated valve. Conventional air operated valves do not require an actuator to operate. Conventional air operated valves can be cost-effective and do not require substantial maintenance, but such valves do not provide a reliable indication of failure. As a result, valve operators can incur substantial expenses when unplanned outages occur.

Conventional air operated valves include a shell that is lined with an elastomer sleeve or tube that is closed by pumping air through a port until the valve is closed. The valve is supplied with constant air pressure (typically around 50-75 psi) above line pressure to close. If the sleeve ruptures, the sleeve is unable to close and the line may become pressurized when attempting to close. Some limitations of conventional air operated valves by incorporating some or all of the features disclosed above. In such implementations, the valve can provide the advantages of a conventional mechanical pinch valve that can still function after sleeve failures.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

What is claimed is:

1. An apparatus for controlling flow through a sleeve, the apparatus comprising:
   a housing,
   a removable frame positioned within the housing,
   a removable, tubular rotational mechanism defining a hole for receiving the sleeve therein,
   a pair of arms pivotally mounted on the rotational mechanism for squeezing the sleeve, and
   an actuator for driving the rotational mechanism to pivot the pair of arms to open and to close the sleeve.

2. The apparatus of claim 1, wherein the actuator is selected from the group consisting of a manual actuator, a power-driven rotary actuator, and a linear actuator.

3. The apparatus of claim 1, wherein the arms are pivotally mounted on the rotational mechanism in a manner that enables each arm to be mounted at any orientation within a range of 360 degrees.

4. The apparatus of claim 1, wherein the arms are mounted to close the sleeve in a horizontal direction.

5. The apparatus of claim 1, wherein the arms are mounted to close the sleeve in a vertical direction.

6. The apparatus of claim 1, wherein the housing includes an upper casing and a lower casing.

7. The apparatus of claim 6, wherein the upper casing and the lower casing are removable.

8. The apparatus of claim 1, wherein the actuator include an actuator brace that defines a cavity.

9. The apparatus of claim 8, wherein the cavity can be pressurized to reduce the force required to close the sleeve.

10. The apparatus of claim 1, wherein the actuator includes a component selected from the group consisting of accumulator with a failsafe pneumatic, a hydraulic device, and a four-way cavity inlet.

11. A pinch valve assembly for controlling flow through a sleeve, the pinch valve assembly comprising:
    a housing, and
    a removable frame positioned within the housing,
    a tubular rotational mechanism defining a hole for receiving the sleeve therein, a pair of arms pivotally mounted on the rotational mechanism for squeezing the sleeve,
    an actuator for driving the rotational mechanism to pivot the pair of arms to open and to close the sleeve; and
    wherein the tubular rotational mechanism is mounted on the frame.

12. The pinch valve assembly of claim 11, wherein the housing includes an upper casing and a lower casing.

13. The pinch valve assembly of claim 11, wherein the upper casing and the lower casing are removable.

14. The pinch valve assembly of claim 11, wherein the actuator include an actuator brace that defines a cavity.

15. The pinch valve assembly of claim 14, wherein the cavity can be pressurized.

16. The pinch valve assembly of claim 11, wherein the actuator is selected from the group consisting of a manual actuator, a power-driven rotary actuator, and a linear actuator.

17. A method for controlling flow through a sleeve, the method comprising:
    providing a housing, a removable frame positioned within the housing, a tubular rotational mechanism with a hole therein and a pair of pivotally mounted arms thereon mounted on the frame,
    inserting the sleeve into the tubular rotational mechanism hole and between the pair of pivotally mounted arms, and
    squeezing the pair of pivotally mounted arms to close the sleeve.

18. The method of claim 17, further comprising:
    driving the pair of pivotally mounted arms.

19. The method of claim 17, further comprising:
    releasing the pair of pivotally mounted arms to open the sleeve.

20. The method of claim 17, further comprising:
    pressurizing an actuator to drive the rotational mechanism to pivot the pair of arms to open and to close the sleeve.

* * * * *